H. LANDSIEDEL.
ADDING AND RECORDING MACHINE.
APPLICATION FILED APR. 17, 1916.

1,225,655.

Patented May 8, 1917.
6 SHEETS—SHEET 1.

Attest:
Charles A. Becker.

Inventor.
Harry Landsiedel,
by Rippey Kingsland
His Attorneys.

H. LANDSIEDEL.
ADDING AND RECORDING MACHINE.
APPLICATION FILED APR. 17, 1916.

1,225,655.

Patented May 8, 1917.
6 SHEETS—SHEET 2.

Attest:
Charles A. Becker.

Inventor.
Harry Landsiedel.
by Rippey Kingsland
His Attorneys.

H. LANDSIEDEL.
ADDING AND RECORDING MACHINE.
APPLICATION FILED APR. 17, 1916.

1,225,655.

Patented May 8, 1917.
6 SHEETS—SHEET 3.

Attest:
Charles A. Becker

Inventor.
Harry Landsiedel,
by his Attorneys.

H. LANDSIEDEL.
ADDING AND RECORDING MACHINE.
APPLICATION FILED APR. 17, 1916.
1,225,655.
Patented May 8, 1917.
6 SHEETS—SHEET 4.
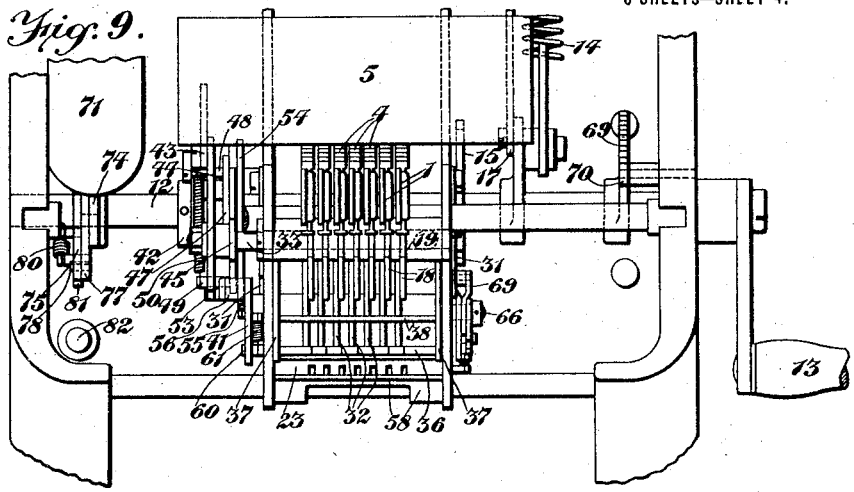
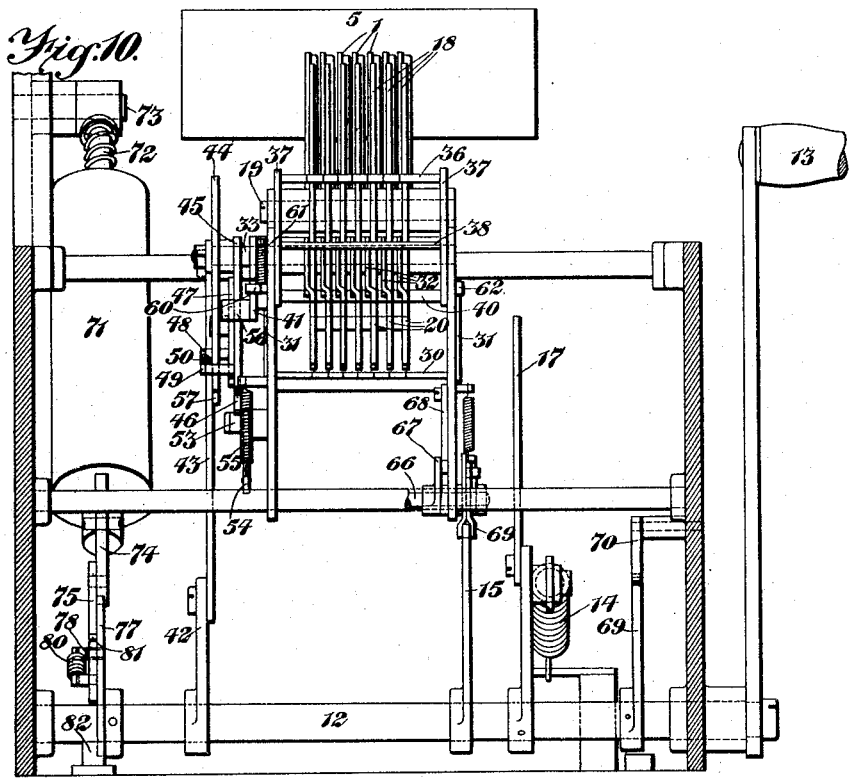
Attest:
Charles A. Becker
Inventor.
Harry Landsiedel,
by Rippey Kingsland
His Attorneys.

H. LANDSIEDEL.
ADDING AND RECORDING MACHINE.
APPLICATION FILED APR. 17, 1916.

1,225,655.

Patented May 8, 1917.
6 SHEETS—SHEET 5.

Attest:
Charles A. Becker

Inventor.
Harry Landsiedel,
by Kippey Kingsland
His Attorneys.

UNITED STATES PATENT OFFICE.

HARRY LANDSIEDEL, OF CINCINNATI, OHIO, ASSIGNOR TO THE DALTON ADDING MACHINE COMPANY, OF CINCINNATI, OHIO, A CORPORATION OF OHIO.

ADDING AND RECORDING MACHINE.

1,225,655.     Specification of Letters Patent.     Patented May 8, 1917.

Application filed April 17, 1916. Serial No. 91,766.

*To all whom it may concern:*

Be it known that I, HARRY LANDSIEDEL, a citizen of the United States, residing at the city of Cincinnati, county of Hamilton, and State of Ohio, have invented a new and useful Adding and Recording Machine, of which the following is a specification.

This invention relates to adding and recording machines, and has particular reference to the recording or listing mechanism thereof.

The machines in which my present invention is adapted to be embodied, and in one of which I have illustrated it, comprise a series of type-carriers operable to position the type carried thereby selectively in different positions to be driven to record. The type-carriers are stopped in their selected recording positions by means of differential stops selectively settable by setting devices so that the type-carriers will be stopped in position for printing the selected numbers, the digits of which are represented by the setting devices operated and by the stops set thereby. After the differential stops have been set by the setting devices the type-carriers are caused to move until stopped by the stops which have been set. The type-carriers are retained in their idle or normal positions by connections under control of a shaft in the machine which is frequently designated as the main shaft. This main shaft has a definite position which it occupies when the machine is idle and from which it turns or revolves to permit the type-carriers to operate. Usually this main shaft is a rock shaft which is rocked in one direction under power controlled by the operator to permit the type-carriers to move to recording position, and is then returned to its starting point to restore the type-carriers and associated parts to their starting points. Printing has heretofore been effected in the machines mentioned by hammers driven percussively against the type, prior to the starting of the rock shaft on its return movement toward its starting point. In rapid operation of the machines this frequently results in imperfect and indistinct printing, because the type-carriers have failed, or have had insufficient time, to assume stationary positions prior to the release of the hammers, so that the type are vibrating when struck by the hammers, resulting in an indistinct and inartistic impression being made upon the paper.

My present invention includes mechanism for driving the type to record after the type-carriers have assumed stationary positions and during the initial part of the return movement of the rock shaft; prior, however, to any return movement of the type-carriers.

The object of the present invention is to produce a novel recording mechanism comprising type-driving hammers under control of actuating devices for percussively driving the hammers against the type, and mechanism for controlling the hammers to drive them against the type during the initial portion of the return movement of the rock shaft; and to harmonize and articulate the movement of the various parts to enable the type to assume stationary positions at the printing line before the rock shaft starts its return movement and before the hammers are operated, thus causing the type to produce clear and distinct impressions upon the paper.

While I have illustrated the invention embodied in a machine, the operation of which is governed by a rock shaft, it will be readily understood that the use of the invention is not restricted to a combination with a rock shaft, but may as readily and usefully be employed in other machines, and in different embodiments. Therefore, although I have illustrated and described the invention embodied in a machine employing a rock shaft, it will be understood that I also contemplate its use in any embodiment in which it may be employed.

Fig. 9 is a plan view of the printing mechanism.

Fig. 10 is a front elevation of the printing mechanism.

Figure 1:
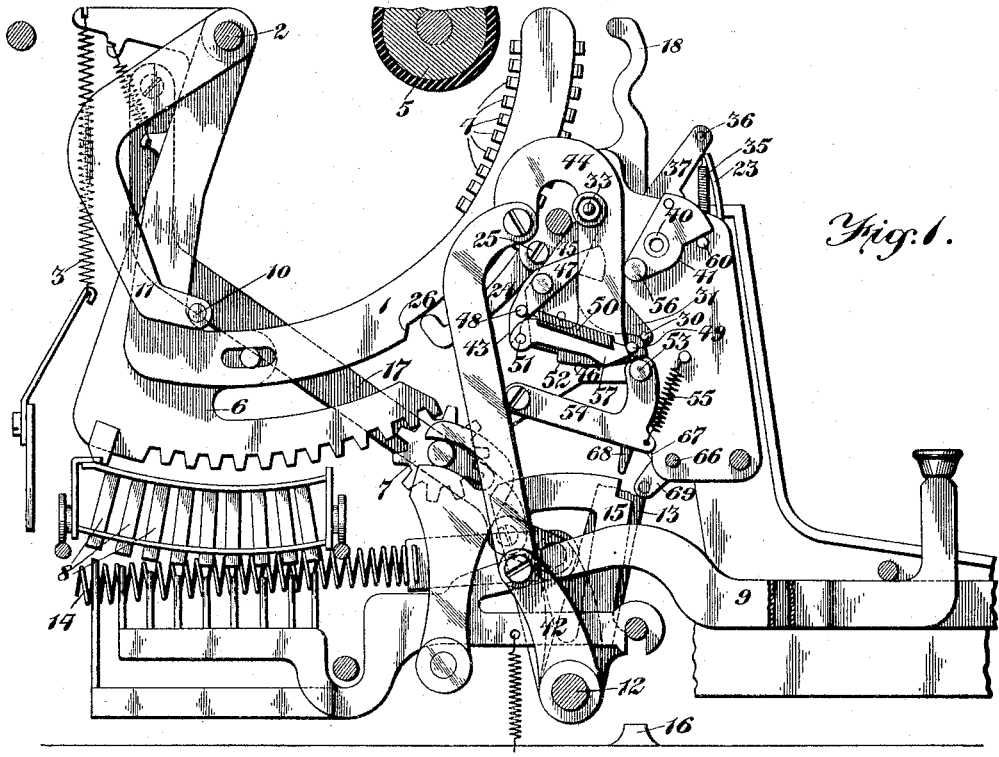
Figure 1 is a side elevation of the recording mechanism embodied in an adding and listing machine, several of the shafts of the machine being in section, the printing mechanism and the main shaft being in their normal positions.

In the machine illustrated the type-carriers 1 are supported by a shaft 2 and are actuated to printing position by springs 3 which exert their power to move the type-carriers to their selected printing positions. Each type-carrier supports a series of movable type 4 which are carried to and from printing positions adjacent to the platen 5 by operation of said type-carriers. Each type-carrier 1 is associated with a rack 6, and said racks are articulated with the adding mechanism 7 so that the latter will be operated to add and represent the total of the numbers recorded. Movement of the type-carriers by the springs 3 is limited by differential mechanism consisting of selectively settable stops 8 which, in the type of machine illustrated, may be set in position to represent the digits of the numbers to be recorded by operation of the key levers 9 in a well-understood manner. The type-carriers and racks are operated to their forward or printing positions by the springs 3, as stated, and are returned to their starting points by a rod 10 supported between two arms 11 attached to the shaft 2.

Figure 3:
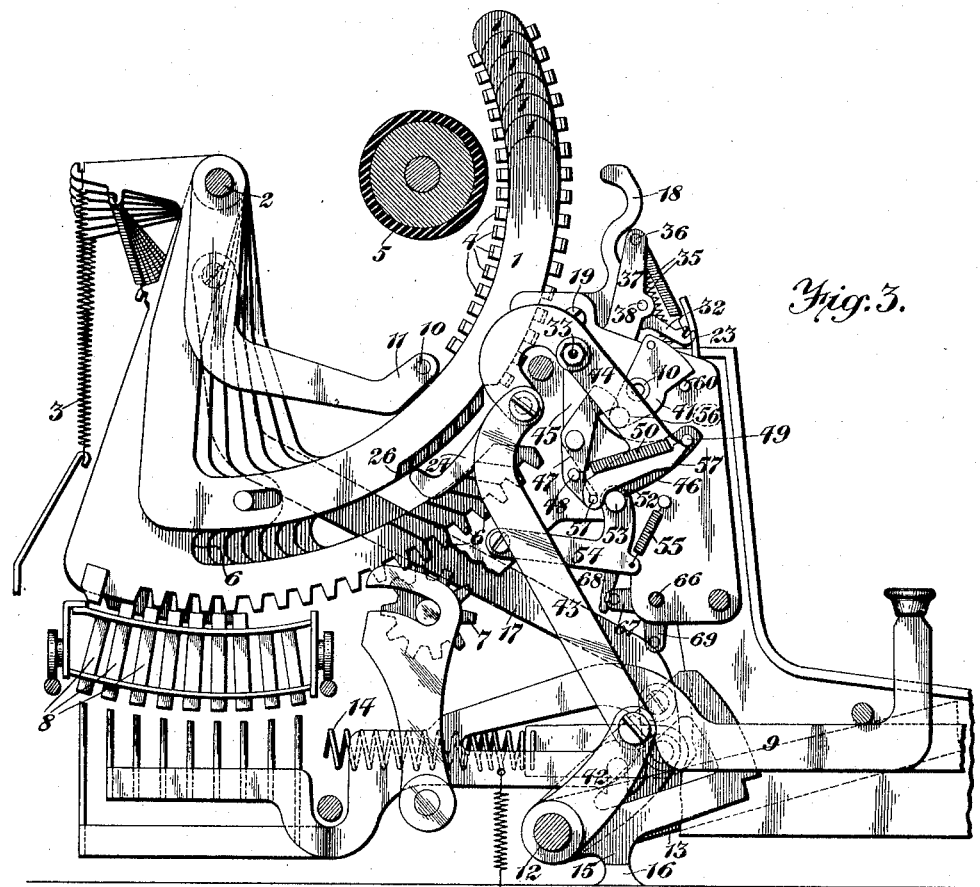
Fig. 3 is a side elevation corresponding to Fig. 1 with the rock shaft and certain of the type-carriers of the machine at the limit of their forward movement.
Figure 4:
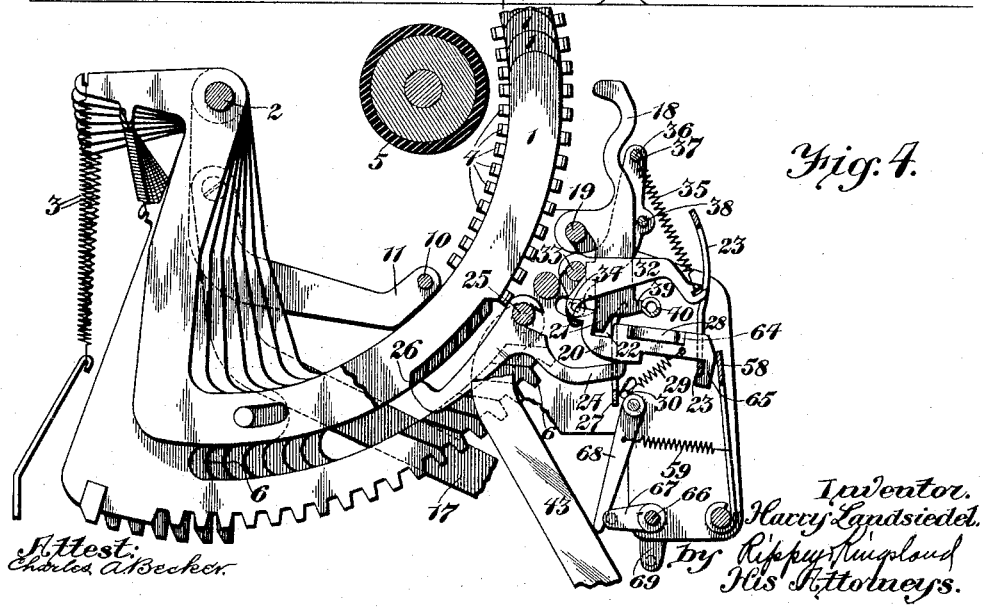
Fig. 4 is a sectional view of the printing mechanism when the rock shaft and certain of the type-carriers are at the limit of their forward movement, and this view may be compared with Fig. 2 which illustrates the same parts before operation of the rock shaft.

The rock shaft 12 is the main shaft previously mentioned, and is capable of being rocked in a forward direction by power applied through a handle 13, or otherwise, and restored to its starting point by a spring 14. Forward movement of the rock shaft is limited by a part 15 on the shaft engaging against an abutment 16 on a stationary part of the machine. The arms 11 are oscillated by the rock shaft through a connecting link 17 so that while the shaft is in its idle position the rod 10 holds the type-carriers from forward movement, and when the shaft 12 is rocked forwardly the arms 11 are moved to carry the rod 10 forwardly from its normal position, shown in Figs. 1 and 2, to the advanced position shown in Figs. 3 and 4, thus permitting the springs 3 to reciprocate and move the type-carriers to their printing positions, which positions are determined by the differential stops 8. When the shaft 12 is returned by the spring 14 the arms 11 are likewise returned to their starting points and they carry the rod 10 rearwardly, thereby moving the type-carriers to their normal position.

Figure 5:
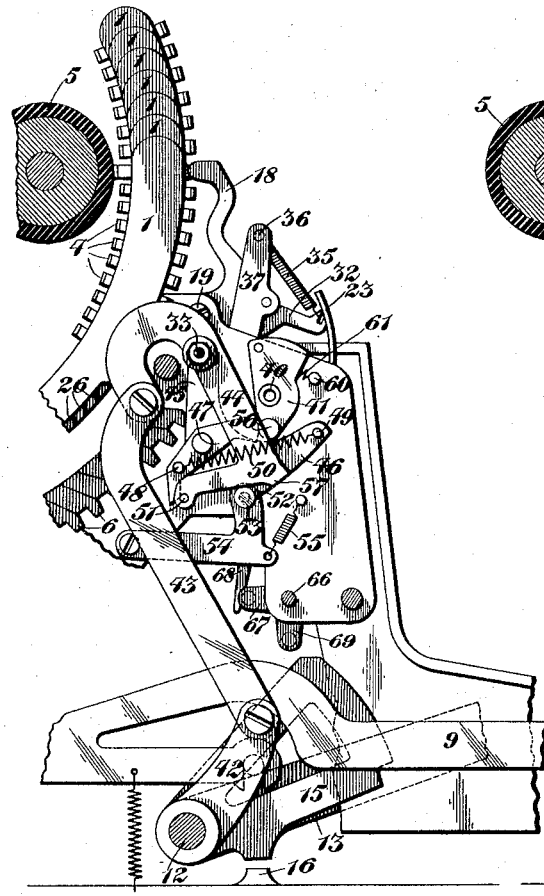
Fig. 5 is a side elevation of the printing mechanism after the rock shaft has started on its return movement and after the hammers have struck the type; this view may be compared with Figs. 1 and 3 which illustrate the same parts in different positions.
Figure 6:
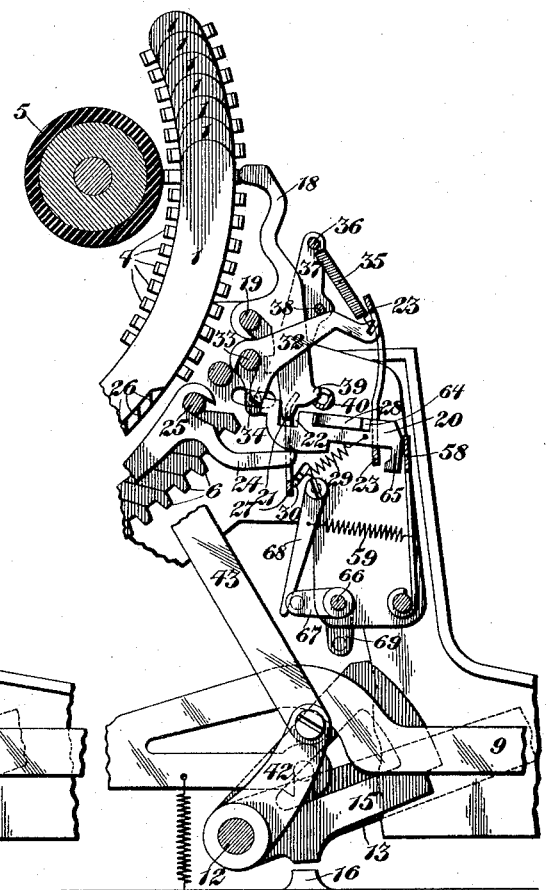
Fig. 6 is a sectional view of the printing mechanism after the rock shaft has started its return movement and after the hammers have been driven to record; this view may be compared with Figs. 2 and 4 which illustrate the same parts in different positions.
Figure 7:
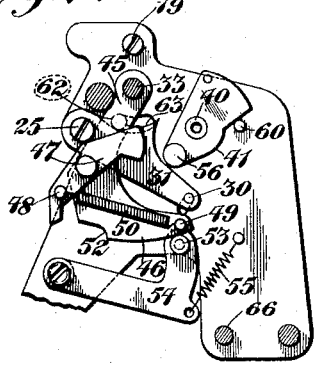
Fig. 7 is a detailed view of the hammer-releasing devices in their normal position.
Figure 8:
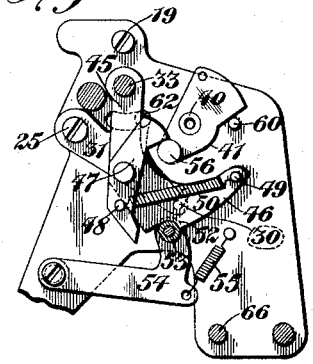
Fig. 8 is a detailed view of the same parts illustrated in Fig. 7, showing the position of said parts when the rock shaft is at the limit of its forward movement, as shown in Fig. 3.
Figure 11:
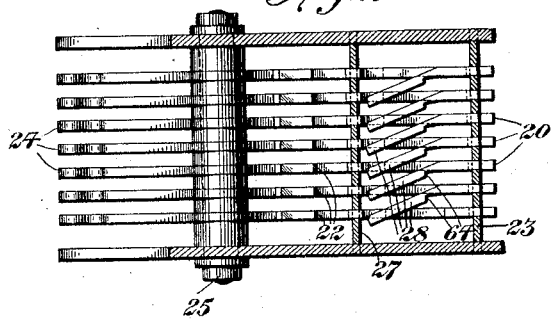
Fig. 11 is a detailed view of the parts which constitute the couplings between the hammers and the hammer actuating devices.
Figure 12:
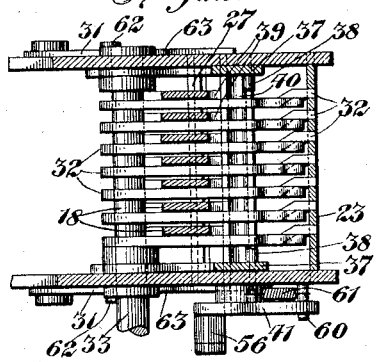
Fig. 12 is a sectional view of the hammers and a plan view of the hammer actuating devices.
Figure 13:
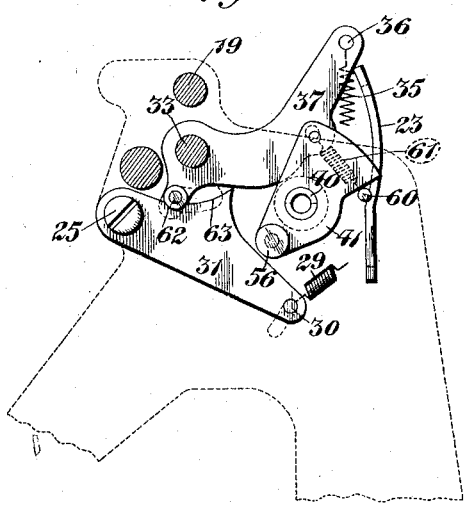
Fig. 13 is a detailed view of the hammer release device and the device for tensioning the springs controlling the operation of the hammers and associated parts.

It is in combination with mechanism of this broad character that my present invention is intended to operate and the type-driving hammers hereinafter described are caused to operate after the type-carriers have been stopped by the differential mechanism and have assumed stationary positions without vibration, and this operation of the hammers is so timed that it occurs after the rock shaft has started its return movement. The printing mechanism includes a series of hammers 18 equal in number to the number of type-carriers 1 and pivotally supported upon a shaft 19 extending transversely adjacent to the type-carriers. Each of said hammers is connected with a corresponding coupling-member 20 by a projection 21 on the hammer extending into a notch 22 in the coupling-member so that when said coupling-members are driven forwardly by the actuating devices the corresponding hammers will be driven against the type, as illustrated in Figs. 5 and 6. The forward ends of the coupling-members are supported in their spaced positions by the lower portion of a comb-plate 23, and the rear or inner portions of said coupling-members are supported by the forward ends of the positioning levers 24. There is one of the positioning levers 23 for each of the type-carriers, and they are pivoted upon a transverse shaft 25 and have their rear ends in position to be engaged and depressed by the shoulders 26 on the type-carriers when the type-carriers move forward beyond zero printing position. The adjacent portions of the couplings 20 and levers 24 are guided between the teeth of a comb-plate 27 so that lateral displacement of any of the parts with respect to the others is prevented. By this construction it will be understood that when any of the type-carriers move to position for printing any digits other than the cipher, the corresponding levers 24 will be operated by the shoulders 26 of the type-carriers, thus raising the forward ends of said levers 24 and the rear portions of the couplings 20. As illustrated in Fig. 11 each of the couplings 20, except the one of highest numerical order, is provided with a projection 28 extending over the coupling in the next higher order, so that when any one of said couplings is raised by operation of the corresponding lever 24, as above described, the other couplings toward the lower orders will also be raised by the projections 28 connecting one with the other. When the type-carriers return to their normal positions the couplings 20 and the forward ends of the levers 24 are drawn downwardly by springs 29 connecting the said couplings respectively with a rod 30 which is supported upon the pivoted arms 31.

Figure 2:
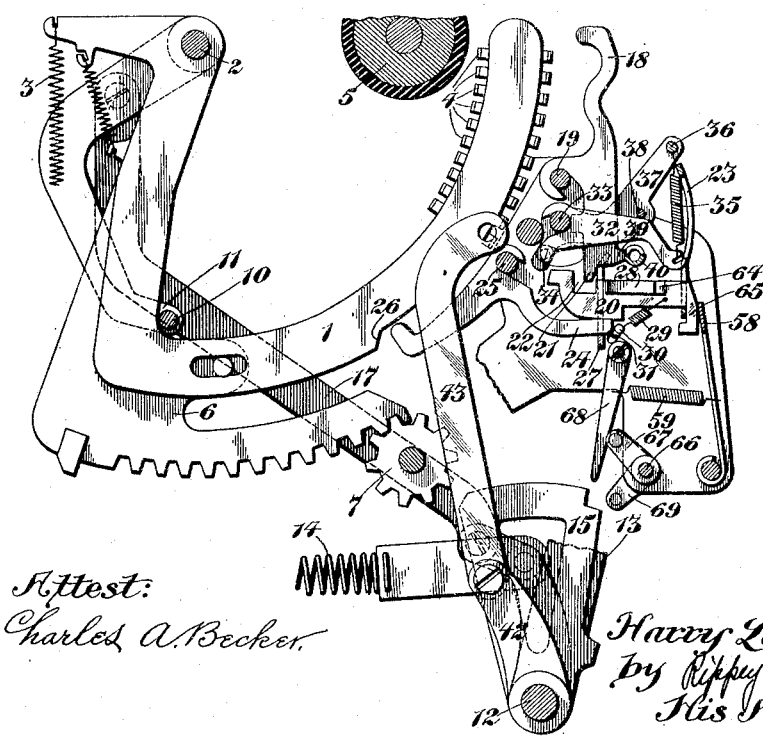
Fig. 2 is a sectional view of the printing mechanism in its normal or idle position before the controlling rock shaft has started on its forward movement.

The actuators for the couplings and hammers comprise arms 32, of which there is one for each hammer and the corresponding coupling, said arms being pivoted upon a shaft 33 extending transversely below the rod 19 and above the rear or inner ends of the couplings 20. When the couplings 20 are in their normal or lowered positions, as illustrated in Fig. 2, the rear or inner extremities thereof are below the depending ends 34 of the actuators, so that the actuators will be free to revolve upon the shaft 33 without engaging the corresponding couplings. However, when the rear or inner ends of the couplings 20 are raised they are placed in the path of movement of the ends 34 of the actuators, so that when the actuators are operated the couplings will be thrown forwardly, thereby driving the hammers against the type as will be understood by reference to Fig. 6. The forward ends of the actuators 32 are guided within the slots of the comb-plate 23, and are connected by springs 35 with a rod 36 supported by two arms 37 attached to the shaft 33. An additional rod 38, supported between the arms 37, constitutes an abutment for the actuators 32 and also a device for depressing or restoring the actuators to their normal positions after operation.

Each of the hammers 18 is formed with a projection 39 adjacent to its lower end adapted to coöperate with a rocking-member 40 which is arcuate in cross section. In the normal or idle position of the member 40 the periphery, adjacent to one edge thereof, is in position to be engaged by the projections 39 so that when the arms 37 are raised movement of the actuators 32 will be prevented, because the projections 39 on the hammers are in contact with the periphery of the member 40 thus preventing movement of the couplings 20. In this way the springs 35 are energized or tensioned by holding the actuators corresponding to the hammers which are to be utilized in printing and raising the arms 37. After the springs of the actuators corresponding to the hammers, which are to be used in printing, have been tensioned in this manner the member 40 is rocked out of contact with the projections 39, thus enabling the springs 35 which had been tensioned to retract thereby operating the actuators 32 and couplings 20 to drive the corresponding hammers against the type to effect printing. The member 40 is not rocked to release the hammers until after the type-carriers have assumed their stationary positions for printing and have ceased vibration. In order to afford ample time for the parts to assume their proper positions for printing I have provided connections for rocking the member 40 to release the hammers during the initial operation of the return movement of the rock shaft 12, and prior to any return movement by the type-carriers. Rocking of the member 40 is effected by operation of an arm 41 attached to said member and actuated in one direction to release the hammers by suitable connections controlled by the rock shaft 12 and actuated in another direction by independent devices restoring the hammers to their idle or normal positions.

Referring now to the connections above mentioned, it will be seen that the rock shaft 12 carries an arm 42 which is pivotally connected by a link 43 with a lever 44 pivoted upon a projecting part of the shaft 33. An arm 45 is attached to the shaft 33 and has an arcuate portion 46 on its lower end. Said arm 45 supports a pivoted lever 47 which has a lateral projection 48 that is connected with a lateral projection 49 at the end of the arcuate portion 46 by a spring 50. The lower end of the lever 47 is engaged by a projection 51 on an arm of the lever 44. When the shaft 12 is rocked forwardly the connections therefrom move the lower end of the lever 44 in a forward direction, said lever 44 moving the arm 45 with it by engaging the projection 49. Thus the shaft 33 is rocked to raise the arms 27. About the time that the shaft 12 reaches the limit of its forward movement a shoulder 52 on the lower end of the arm 45 makes latched engagement with a projection 53 carried by a pivoted member 54, and actuated toward the arm 45 by a spring 55. When the shaft 12 and the other parts moved thereby are in their forward positions the upper end of the lever 47 is adjacent to a projection 56 on the arm 41 in position to actuate said arm by proper movement of said lever 47.

When the shaft 12 is started on its return movement it actuates the lever 44 toward its starting point while the arm 45 is held stationary because of the latched engagement of the shoulder 52 thereon with the projection 53. This movement of the lever 44 with respect to the arm 45 causes the pin 51 to actuate the lever 47 in opposition to the spring 50, the upper end of said lever 47 operating the arm 41 and thereby rocking the member 40 until the edge thereof is below the abutting projections 39 on the hammers 18. Since the shaft 33 is a rock shaft to which the arms 37 and the arm 45 are attached, it will be understood that the forward movement of the lower part of the arm 45 rocks the shaft 33 and moves the arms 37 to position to stretch the springs 35, because of the fact that the actuators 32 are held stationary by engagement with the couplings 20 which are held from movement by the hammers that are in engagement with the member 40. When the member 40 is rocked below the abutting projections 39 on the hammers, said hammers are freed from restraint and the corresponding actuators are permited to operate under the power exerted by their springs 35, so that the corresponding hammers are driven against the type as will be understood by reference to Fig. 6. As appears from the foregoing the rocking of the member 40 is effected as a result of the return motion by the lever 44 causing the pin 51 to actuate the lever 47 since the arm 45 is held from movement by the shoulder 52 thereon being in engagement with the projection 53. After the hammers have been released in this manner and have been driven against the type by the retraction of the springs 35, the arm 45 is released from its latched engagement by means of a cam 57 on the lower edge of the lever 44 contacting with and depressing the projection 53 out of engagement with the shoulder 52, after which the spring 50 immediately retracts to move the arm 45 and thereby the shaft 33 and the arms 37 toward their starting points, and this movement is continuous until the pin 49 strikes the edge of the lever 44, after which time the arm 45 and its associated parts accompany the lever 44 in its movement toward idle position. As the arms 37 are thus returned to their idle positions the rod 38 thereon which is in engagement with the actuators 32 that had been operated restores them to their idle positions, while the couplings 20 are restored to their normal positions by their springs 29 and by a member 58 which is drawn against the forward ends of said couplings by a spring 59 connecting said member with some part of the machine.

The arm 41 is connected with an abutment 60 by a spring 61 so that when said arm is released from the lever 47 it will be returned to its starting point by the retraction of said spring. The lower edges of the projections 39 are inclined with respect to the member 40 so that when the member 40 is rocked or turned toward its starting point by the spring 61, the edge of said member 40 rubbing against the lower inclined edges of the projections 39 will press the lower ends of the hammers 18 rearwardly and draw the upper ends of said hammers away from the type, thus restoring the hammers to their starting points. In this way the springs 29, 59 and 61 coöperate to restore the hammers and the couplings to their normal positions, while the spring 14 serves to restore the rock shaft 12 and the parts under control thereof to idle position.

The arms 31 which support the rod 30 are actuated to tension the springs 29 as an incident to the raising of the arms 37 by projections 62 on said arms 37 operating against cam surfaces 63 on the arms 31, thereby depressing the forward ends of the arms 31 and expanding the spring 29, so that said springs 29 will coöperate with the springs 59 and 61 to restore the hammers 18 and the couplings 20 to idle position. The forward movement of the couplings 20 is limited by shoulders 64 thereon coming in contact with the comb-plate 23, and rearward movement of said couplings is limited by depending projections 65 thereon engaging with the supporting portion of the comb-plate. The tension of the restoring spring 59 may be increased by rocking the rod 66 and causing an arm 67 on the rod to press rearwardly the arm 68 with which the rear end of the spring 59 is connected. The rod is rocked for this purpose by the part 15 contacting with a member 69 attached to the rod 66, so that said rod 66 is rocked in one direction by the forward movement of the part 15 to tension the spring 59 and in the opposite direction by the return movement of said part 15.

The machine is equipped with mechanism to prevent harmful effects, resulting from jerking the operating lever to turn the rock shaft 12 with unnecessary damaging force. It is well understood that adding machines are provided with full stroke mechanism to compel the controlling shaft thereof to be turned uniform distances at different operations thereof, and the full stroke mechanism is effective to lock the shaft against return movement until it has moved the full extent of movement required. This full stroke mechanism is conventionally illustrated in Figs. 9 and 10 and consists of a segmental plate 69$^a$ on the shaft 12 and provided with notches in its curved edge. A pawl 70 rides upon the notched edge of the plate 69ª and will prevent return movement of the shaft until the shaft has turned forwardly the full extent of its movement, at which time the plate 69ª passes beyond the pawl 70 enabling the shaft to be returned by its spring 14, or otherwise.

Figure 14:
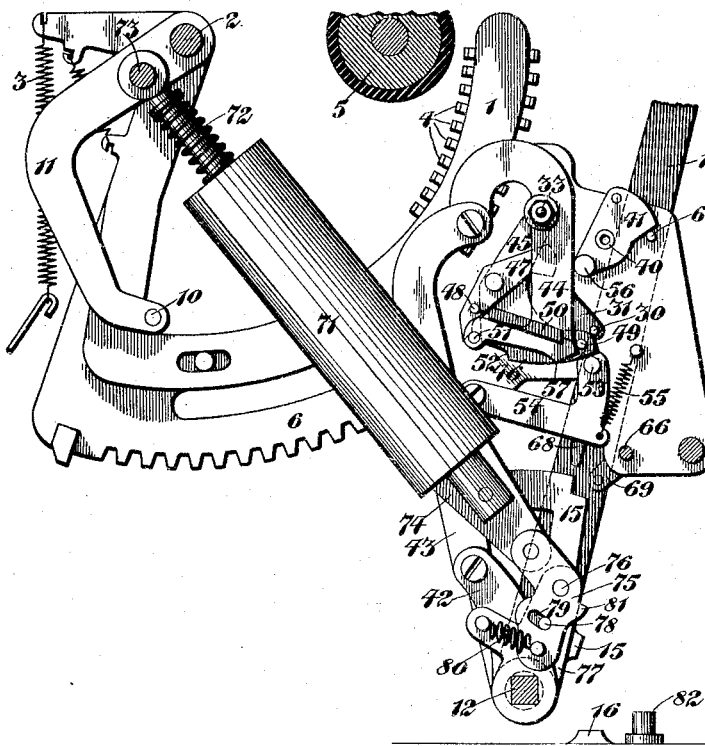
Fig. 14 is a view illustrating in its normal position the retarding device which is effective to prevent too rapid operation of the machine.
Figure 15:
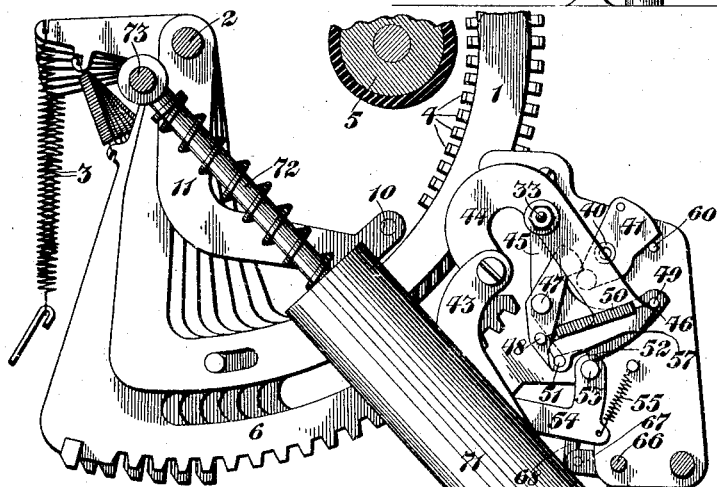
Fig. 15 is a view showing the retarding device in the position assumed when the machine is operated at a speed in excess of its intended operation.

The present machine is also equipped with a retarding device comprising a dash pot 71 having its piston rod 72 attached to a stationary part 73. An arm 74 (Figs. 14 and 15) on the lower end of the dash pot is pivoted to one arm of an angular plate 75. The plate 75 is mounted on a pivot 76 supported by an arm 77 attached to the shaft 12. A projection 78 on the arm 77 extends into a slot 79 in the plate 75 and thus limits movement of the plate upon its pivot in respect of the arm 77. A strong spring 80 connects the lower end of the plate 75 with a projection on the arm 77 and thus holds the plate 75 normally in the position illustrated in Fig. 14, in which the projection 78 is at the forward end of the slot 79. The spring 80 will retain the parts in this position under normal or desired operations of the machine, but when the shaft 12 is turned with too great speed the spring 80 will yield to the resistance of the dash pot and the plate 75 will assume the position illustrated in Fig. 15. The plate 75 is provided with a projection 81 which, when said plate is retained in the position shown in Fig. 14, will not contact with the abutment 82; however, when the plate 75 is moved as above described, by too rapid operation of the shaft 12, the projection 81 will contact with the abutment 82 so that additional movement of the shaft 12 is required to move the plate 69 beyond the pawl 70 before the shaft can start on its return movement, and before printing can be effected. Thus, continued pressure must be applied to the operating handle 13 in order to effect printing and in order to enable the mechanism to return to its normal position. The power of the spring 80 will gradually overcome the resistance within the dash pot and return the plate 75 to the position relative to the arm 77 illustrated in Fig. 14, thus moving the projection 81 out of contact with the abutment 82 and enabling the shaft 12 to be turned the full extent of the movement required to release the plate 69ª from the pawl 70. As illustrated in Fig. 15, the projection 53 cannot become engaged with the shoulder 52 until the shaft 12 has completed its forward movement, so that the actuating mechanism of the hammers will not be brought under control of the connections from the shaft 12 until the full forward movement of the shaft is completed. In this manner the mechanism associated with the retarding device, which in the present instance is in the form of a dash pot, is effective to prevent too rapid operation of the machine and to prevent printing whenever the machine is operated at such speed or by such force that injury would result.

The advantages of this type of printing mechanism and its mode of operation over the usual mechanisms are apparent. In actual practice it has been determined that irrespective of the rapidity of operation of the rock shaft 12 and its associated parts, the type-carriers have sufficient time to assume their final printing positions and to cease vibrating before the hammers are released and driven against the type. Printing mechanisms heretofore in general use in adding and listing machines, in which the printing type were supported loosely on the type-carriers and driven by hammers, were subject to the disadvantage that in rapid operation of the machines the type-carriers did not always have sufficient time to assume proper printing position and to cease vibration before the hammers were released, thus frequently resulting in releasing the hammers while the type were vibrating and driving the wrong type to print, or causing the hammers to strike the type while the type-carriers were in vibration and produce indistinct and imperfect impressions. My present invention wholly overcomes these difficulties and disadvantages and possesses the additional advantage that the hammers and the couplings are restored to their idle positions by spring-actuated devices independent of the powerful springs controlling the return of the main shaft, while the actuators 32 are returned by the connections from the main shaft.

It will be understood that the printing mechanism may be conveniently embodied in different types of machines and that its use is not restricted to the particular type of machines illustrated. Also many alterations and improvements may obviously be made without departing in the least from the principle and scope of the invention.

What I claim and desire to secure by Letters Patent of the United States, is:—

1. In an adding machine, the combination of type-carriers, spring actuated hammers for driving the type on said type-carriers to print, a rock shaft, mechanism for positioning said type-carriers for printing as an incident to the rocking of said shaft in one direction, and mechanism for operating said hammers to drive the type controlled by said rock shaft and arranged to operate during the initial movement of said rock shaft toward its starting point after said type-carriers have been positioned.

2. In an adding and recording machine, type-carriers movable to and from recording position, hammers for driving the type on said type-carriers to print, actuators for said hammers, a rock shaft, automatic mechanism for moving said type-carriers to and holding them in recording position while said rock shaft is moving in one direction, and mechanism, controlled by said rock shaft during the initial portion of its movement to its starting point after said type-carriers have been positioned, for operating said actuators to drive the type to print.

3. In an adding and recording machine, the combination of type-carriers movable to and from recording position, differential mechanism for stopping said type-carriers in recording position, a rock shaft, means for moving said type-carriers to recording position as an incident to the rocking of said shaft in one direction from its starting point, hammers for coöperating with the type to print, actuators for said hammers, releasable couplings for connecting said actuators and hammers, and mechanism controlled by said rock shaft for operating said hammers to coöperate with the type after said rock shaft has completed its movement in one direction and has started on its movement in the opposite direction toward its starting point.

4. In an adding and recording machine, the combination of type-carriers, differential mechanism for stopping said type-carriers, a rock shaft, actuators for said type-carriers, means controlled by said rock shaft to enable said actuators to move said type-carriers to recording position during the movement of said rock shaft from its starting point, hammers for coöperating with the type to print, a pivoted actuator for each of said hammers, a spring for operating each actuator, means preventing operation of said actuators and said hammers while said rock shaft is moving from its starting point, and means controlled by said rock shaft for enabling said actuators to operate said hammers during the movement of said rock shaft toward its starting point after said type-carriers have become stationary.

5. In an adding and recording machine, the combination with type-carriers, a rock shaft, mechanism controlled by said shaft for moving said type-carriers to recording position while said rock shaft is moving from its starting point, and mechanism for stopping said type-carriers in recording position during the movement of said rock shaft from its starting point, of hammers for coöperating with said type-carriers to print, couplings for said hammers, means operated by said type-carriers for connecting said couplings with said hammers, and mechanism controlled by said rock shaft for operating couplings and thereby said hammers after said type-carriers have stopped and during the movement of said rock shaft toward its starting point.

6. In an adding and recording machine, a series of type-carriers, differential mechanism for stopping said type-carriers in recording position, springs for actuating said type-carriers, a rock shaft, mechanism controlled by said rock shaft to enable said springs to move said type-carriers to recording position during the movement of said rock shaft from its starting point, hammers for coöperating with the type to record, actuators for said hammers, mechanism controlled by said type-carriers determining which of said hammers will be operated by said actuators, and mechanism controlled by said rock shaft preventing said hammers from being operated during the entire movement of said rock shaft from its starting point and enabling said hammers to be operated during the movement of said rock shaft toward its starting point.

7. An adding and recording machine, comprising type-carriers adapted to be moved to and from recording position, hammers for coöperating with the type on said type-carriers to record, actuators for said hammers normally disconnected therefrom, automatic means for connecting said actuators and hammers, in combination with a rock shaft, mechanism controlled by said rock shaft as an incident to the movement thereof from its starting point operable to move said type-carriers to recording position, and mechanism controlled by said rock shaft for operating said actuators during the movement of said rock shaft toward its starting point, whereby said hammers will be operated during return movement of said rock shaft, while the type-carriers are stationary.

8. An adding and recording machine, comprising type-carriers, differential mechanism for controlling said type-carriers, a rock shaft, means for rocking said shaft in one direction from its starting point, mechanism controlled by said rock shaft for actuating said type-carriers to printing positions as determined by said differential mechanism, hammers, means holding and preventing operation of said hammers during the entire time that said rock shaft is moving from its starting point, and mechanism controlled by said rock shaft for releasing said holding means and operating said hammers during the time that said rock shaft is moving toward the starting point and while said type-carriers are held in printing position by said differential mechanism.

9. In an adding and recording machine, the combination with type-carriers, a rock shaft, means for rocking said shaft from its starting point, mechanism for operating said type-carriers to printing position as an incident to the rocking of said shaft from its starting point, and differential mechanism for stopping said type-carriers in selected printing positions before said rock shaft operates on its movement toward its starting point, of hammers, actuators for said hammers, an abutment member holding and preventing said hammers from operating while said rock shaft is moving from its starting point, and mechanism controlled by said rock shaft for moving said abutment member out of engagement with said hammers and enabling said actuators to operate during the movement of said rock shaft toward its starting point.

10. In an adding and recording machine, a series of type-driving hammers, a pivoted actuator for each hammer, springs for operating said actuators as required to drive said hammers to print, couplings movable to and from position to effect operative connection between said actuators and said hammers respectively, means for tensioning said springs, and means for operating said actuators and thereby said couplings and hammers after said springs have been tensioned.

11. In an adding and recording machine, a series of type-driving hammers, actuators for said hammers respectively, springs for operating said actuators, couplings movable to and from position to couple said actuators with said hammers respectively, a device for tensioning said springs, means for preventing operation of said actuators and hammers while said springs are being tensioned, and means for releasing said device after said springs have been tensioned.

12. In an adding and recording machine, printing mechanism comprising printing type, hammers for coöperating with said type to effect printing, a support on which said hammers are pivotally mounted, actuators for said hammers respectively, a movable part, springs connecting said actuators with said movable part, couplings movable to and from position to connect said actuators respectively with the corresponding hammers, means for moving said movable part to tension said springs, means holding said hammers and actuators from operation while said springs are being tensioned, and means for releasing said hammers to enable said actuators to drive them to coöperate with the type after said springs have been tensioned, as aforesaid.

13. In an adding and recording machine, movable type-carriers having type mounted thereon, hammers for coöperating with the type on the respective type-carriers, actuators for said hammers, couplings movable to and from position to couple said actuators with the respective hammers, devices controlled by the type-carriers for moving said coupling to position to couple the actuators with the hammers, and means for operating said actuators and said hammers as required to cause said hammers to coöperate with the type on said type-carriers to print.

14. In an adding and recording machine, a series of type-driving hammers, a pivoted actuator at the side of each of said hammers, springs for operating said actuators, couplings movable to and from position to couple said actuators with said hammers, elements for moving said couplings to position to couple said actuators with said hammers, and additional elements for moving said actuators out of position to couple said actuators with said hammers.

15. In an adding and recording machine, a series of type-driving hammers, actuators for said hammers, couplings movable to and from position to couple said actuators with said hammers, springs for operating said actuators, means for tensioning said springs after said couplings have been moved to position to couple said actuators with said hammers, a device preventing operation of said actuators and hammers while said springs are being tensioned, and means for moving said device to enable said actuators and hammers to operate after said springs have been tensioned.

16. In an adding and recording machine, a series of hammers, actuators for said hammers, a device holding said hammers from operation, couplings movable to and from position to couple said actuators with said hammers, springs for operating said actuators, means for tensioning said springs while said hammers are held from operation and means for releasing said device from said hammers after said springs have been tensioned.

17. In an adding and recording machine, a series of pivoted hammers, a rocking member preventing movement of said hammers in one direction, actuators for said hammers, couplings movable to and from position to couple said actuators with said hammers, springs for operating said actuators, means for rocking said rocking member to release said hammers, and means for restoring said actuators to idle position.

18. In an adding and recording machine, a series of type-carriers, type mounted on said type-carriers, hammers for coöperating with said type, actuators for said hammers, couplings normally disengaged from said hammers and controlled by said type-carriers for coupling said actuators with said hammers, and means for timing the operation of said actuators and hammers so that said hammers will be operated by said couplings after said type-carriers have stopped.

19. In an adding and recording machine, a series of type-carriers movable to and from recording position, hammers for cooperating with the type to print, actuators for said hammers, couplings movable to and from position to couple said actuators with said hammers, mechanism controlled by the type-carriers which move to recording position for moving said couplings to couple the corresponding actuators with the hammers corresponding to the type-carriers which are in recording position, means for operating said actuators and hammers after said type-carriers have stopped in recording position, and means for moving said couplings to position to disconnect said actuators from said hammers.

20. In an adding and recording machine, a series of hammers, a series of couplings corresponding to said hammers, means normally holding said couplings out of position to couple said hammers and said actuators, means for moving said couplings to position to couple said actuators with said hammers, springs for operating said actuators, and a device determining when said actuators may operate said hammers.

21. In an adding and recording machine, a series of hammers, actuators for said hammers, couplings movable to and from position to couple said actuators with said hammers, springs for operating said actuators, a device preventing said actuators from operating said hammers, and means for releasing said device to enable said actuators to operate said hammers.

22. In an adding and recording machine, comprising a series of hammers, a series of actuators for said hammers, a coupling device movable to and from position to couple said actuators with said hammers, means normally holding said coupling device out of position to couple the actuators with the hammers, means for moving said coupling device to position to couple the actuators with the hammers, a device preventing operation of said hammers by said actuators, a rock shaft, and mechanism controlled by said rock shaft for releasing said device to enable said actuators to operate said hammers.

23. In an adding and recording machine, a series of hammers, actuators for said hammers, springs for operating said actuators, a device engaging all of said hammers to prevent said actuators from operating them, couplings movable to and from position to couple said actuators with said hammers, a rock shaft, mechanism controlled by said rock shaft for releasing said device from said hammers, and means for operating said actuators and thereby said hammers after said device has been released.

24. In an adding and recording machine, a series of type-carriers, a series of hammers corresponding with said type-carriers, a series of actuators for said hammers, couplings movable to and from position to couple said actuators with said hammers, a rock shaft, mechanism for moving said type-carriers to recording position as an incident to the movement of said rock shaft in one direction, and mechanism for causing said actuators to operate said hammers as an incident to the movement of said rock shaft in the opposite direction.

25. In an adding and recording machine, a series of type-carriers arranged in numerical order, hammers arranged in numerical order corresponding to the type-carriers, actuators for said hammers, couplings movable to and from position to couple said actuators with said hammers, means controlled by the type-carriers which move to recording position for moving the couplings of the corresponding actuators and hammers to position to couple the actuators and hammers, a rocking member preventing operation of said hammers by said actuators, and means for rocking said member to enable said actuators to operate said hammers.

26. In an adding and recording machine, a series of type-driving hammers, pivoted actuators for said hammers, a movable member, springs connecting said movable member with said actuators, couplings movable to and from position to couple said actuators with said hammers, a device preventing operation of said hammers and actuators when said member is moved to tension said springs, and means for operating said device to enable said actuators to operate the corresponding hammers after said springs have been tensioned by the movement of said member.

27. In an adding and recording machine, a series of pivoted hammers, actuators for said hammers, couplings movable to and from position to couple said actuators with said hammers, a rock shaft, a rocking member preventing movement of said hammers by said actuators, a lever for operating said rocking member to release said hammers, and connections from said rock shaft for operating said lever.

28. In an adding and recording machine, a series of type-driving hammers, a rod on which said hammers are pivoted, a series of pivoted actuators for said hammers, sliding couplings movable to and from position to couple said actuators with said hammers, means normally holding said couplings out of position to couple said actuators and hammers, devices for moving said couplings to position to couple said actuators and hammers, springs for actuating said actuators, a movable member for tensioning said springs, a device holding said hammers and thereby said actuators from operation while said springs are being tensioned, and means for releasing said device after said springs have been tensioned.

29. In an adding and recording machine, a series of type-driving hammers, a series of actuators for said hammers, supports on which said hammers and actuators are respectively mounted, a coupling movable to and from position to couple said actuators and hammers, means for moving said couplings in series to couple a series of said actuators and hammers, springs for operating said actuators, a movable rod for tensioning said springs, a support for moving said rod, a device preventing operation of said hammers and actuators while said springs are being tensioned, means for releasing said device to enable said actuators to operate said hammers, and means for operating said device to restore said hammers to their starting points.

30. In an adding and recording machine, a series of type-driving hammers, a series of actuators for said hammers, couplings for connecting said hammers and actuators and normally in position in which said hammers and actuators are disconnected, means for moving said couplings to position to connect said hammers and actuators respectively, a device preventing operation of said hammers by said actuators, means for releasing said device to enable said actuators to move said hammers, means for operating said device to restore said hammers to idle position, and additional means for restoring said actuators to idle position.

31. In an adding and recording machine, a series of type-carriers arranged in numerical order, a series of hammers corresponding with said type-carriers, an actuator for each of said hammers, a coupling for each actuator movable to and from position to couple said actuator with the corresponding hammer, and means operated by the type-carriers for moving said couplings to position to couple the actuators with the hammers corresponding to the type-carriers which operate.

32. In an adding and recording machine, a series of type-carriers arranged in numerical order, a hammer for each of said type-carriers, an actuator for each of said hammers, couplings movable to and from position to couple said actuators with said hammers, means controlled by said type-carriers for moving said couplings to position to couple the actuators with the hammers corresponding to the type-carriers which operate, and means for holding the remaining couplings out of position to couple the hammers and actuators.

33. In an adding and recording machine, a printing device comprising a type-carrier movable to and from recording position, a hammer adjacent to said type-carrier, an actuator for said hammer, a coupling movable to and from position to couple said actuator with said hammer, a lever for moving said coupling to position to couple said actuator with said hammer, means for operating said lever by said type-carrier as an incident to the movement of said type-carrier to recording position, and means for moving said coupling to position to disconnect said actuator and said hammer.

34. In an adding and recording machine, recording mechanism comprising a series of type-carriers arranged in numerical orders movable to and from recording position, hammers corresponding to said type carriers, actuators for said hammers, couplings movable to and from position to couple said actuators and said hammers, levers operated by the type-carriers for moving the couplings to position to couple said actuators and hammers when said type-carriers move beyond zero printing position, and means whereby the couplings in higher numerical orders when moved to coupling position will also move the remaining couplings in lower numerical orders.

35. In an adding and recording machine, a series of hammers operable in recording operations, actuators for said hammers and a device for preventing operation of said hammers, in combination with a rock shaft, mechanism controlled by said shaft when moving in one direction for adjusting said actuators for operating selected ones of said hammers, and means operated by said rock shaft when moving in the opposite direction for releasing said device to enable said selected hammers to be operated by said actuators.

36. In an adding and recording machine, the combination with a series of hammers, normally deënergized actuators for said hammers and a device for preventing operation of said actuators and hammers while said actuators are being energized, of a rock shaft, mechanism for energizing said actuators by the movement of said shaft in one direction, and mechanism for releasing said device by the movement of said shaft in the opposite direction after said actuators have been energized.

37. In an adding and recording machine, the combination with a series of type-driving hammers, normally deënergized actuators for said hammers and a device preventing operation of said hammers and actuators while said hammers are being energized, of a rock shaft, mechanism operated by said shaft when moving in one direction for energizing said actuators, mechanism operated by said shaft when moving in the opposite direction for releasing said device to enable said actuators to operate said hammers, and means for operating said device to restore said hammers to idle position.

38. In an adding and recording machine, the combination with a series of type-driving hammers, normally deënergized actuators for said hammers, couplings movable to and from position to connect said actuators and hammers, means for moving said couplings to position to connect said hammers and actuators, and a device for preventing operation of said actuators and hammers while said actuators are being energized, of a rock shaft, mechanism operated by said rock shaft when moving in one direction for energizing said actuators, means for releasing said device from said hammers to enable said actuators and hammers to operate, and means operated by said rock shaft when moving in the opposite direction for restoring said actuators to their starting points and deënergizing them.

39. In an adding and recording machine, a series of type-driving hammers, normally deënergized actuators for said hammers, a rock shaft, means for actuating said shaft in one direction, means controlled by said rock shaft when operated in the direction mentioned for energizing said actuators, a device for preventing operation of said actuators and hammers while said actuators are being energized, additional means for actuating said rock shaft in the opposite direction from that mentioned toward its starting point, and mechanism actuated by said rock shaft while being operated by said additional means for releasing said device to enable said actuators to operate said hammers.

40. In an adding and recording machine, a series of type-driving hammers, normally deënergized actuators for said hammers, a rock shaft, mechanism operated by said rock shaft when moving from its starting point for energizing said actuators, a device preventing operation of said hammers while said rock shaft is moving from its starting point, a power device for returning said shaft to its starting point, mechanism operated by said shaft while moving toward its starting point for releasing said device to enable said actuators and hammers to operate, and means for operating said device to restore said hammers to idle position after operation.

41. In an adding and recording machine, a series of type-driving hammers, normally deënergized actuators for said hammers, a device for energizing said actuators, a rock shaft, means controlled by said rock shaft when moving from its starting point for operating said device to energize said actuators, an abutment preventing operation of said hammers while said actuators are being energized, means for releasing said abutment to enable said actuators and hammers to operate, and means for operating said abutment to restore said hammers to their idle positions after they have operated.

42. In an adding and recording machine, a series of type-driving hammers, a series of normally deënergized actuators for said hammers, couplings movable to and from position to couple said actuators and hammers, devices for moving said couplings to position to couple said actuators and hammers, a rock shaft, mechanism operated by said rock shaft when moving from its starting point for energizing the actuators which are coupled with the corresponding hammers, a device for preventing operation of said hammers and actuators while the latter are being energized, and mechanism operated by said rock shaft when moving toward its starting point for releasing said device to enable the energized actuators to operate the corresponding hammers.

43. In an adding and recording machine, a series of type-driving hammers, a series of actuators for said hammers, normally deënergized springs for operating said actuators, a rock shaft, mechanism operated by said rock shaft when moving from its starting point for energizing said springs, a device preventing operation of said actuators while said springs are being energized, mechanism operated by said rock shaft when moving toward its starting point for releasing said device, means for operating said device to restore said hammers to idle position, and a member for restoring said actuators to idle position.

44. In an adding and recording machine, a series of pivoted hammers, a series of pivoted actuators for said hammers, normally deënergized springs for operating said actuators, a rock shaft, a connection to which said springs are connected, means operated by said rock shaft when moving from its starting point for operating said connection to energize said springs, a device preventing operation of said hammers and actuators while said springs are being energized, means for releasing said device, and a member for restoring said actuators to idle position.

45. In an adding and recording machine, a series of pivoted hammers, a series of pivoted actuators for said hammers, couplings for connecting and disconnecting said hammers and actuators, a rock shaft, mechanism for moving said couplings to position to connect said actuators and hammers, springs for operating said actuators, mechanism operated by said rock shaft when moving from its starting point for energizing the springs whose actuators are connected with the corresponding hammers by said couplings, a device in engagement with said hammers to prevent movement thereof while said springs are being energized, and means for releasing said device after said springs have been energized to enable said actuators and couplings to operate said hammers.

46. In an adding and recording machine, a series of hammers, a type-carrier for each hammer movable to and from recording position, a normally deënergized actuator for each hammer, a coupling for connecting and disconnecting said actuators with the corresponding hammers respectively, means operated by the type-carriers for moving said couplings to position to couple the actuators with the hammers corresponding to the type-carriers which operate, a rock shaft, a part holding said type-carriers, means operated by said rock shaft when moving from its starting point for releasing said part to enable said type-carriers to operate, mechanism operated by said rock shaft when moving from its starting point for energizing the actuators of the hammers corresponding to the type-carriers which operate, and a releasable device holding said hammers from operation while said actuators are being energized.

47. In an adding and recording machine, a series of hammers, a series of type-carriers, actuators for said hammers, couplings controlled by said type-carriers for connecting said actuators and hammers, a rock shaft, mechanism operated by said rock shaft when moving from its starting point for energizing said actuators, a device preventing operation of said hammers and actuators while said rock shaft is moving from its starting point, a lever operated by said rock shaft for releasing said device, and automatic means for operating said device to actuate said hammers to idle position after they have been operated by said actuators.

48. In an adding and recording machine, a series of hammers, a series of pivoted arms which correspond with said hammers respectively, couplings, means for moving said couplings to position to connect said hammers and arms, springs for actuating said arms, means for energizing said springs after said couplings have been moved to position to connect said arms and hammers, a device preventing operation of said hammers while said springs are being energized, a rock shaft, mechanism operated by said rock shaft for releasing said device after said springs have been energized, means for operating said device to restore said hammers to idle position after they have been operated by said arms and couplings, and a member for restoring said arms to idle position.

49. In an adding and recording machine, a series of hammers, an arm for each of said hammers, couplings for connecting and disconnecting said arms and hammers, means for moving said couplings to position to connect said arms and hammers, a rock shaft, a device for preventing operation of said arms and hammers while said rock shaft is moving from its starting point, and mechanism controlled by said rock shaft while moving toward its starting point for releasing said device and for operating said arms and hammers and for restoring said arms and hammers to idle position.

50. In an adding and recording machine, a series of hammers, a series of arms for said hammers, a rock shaft, mechanism controlled by said rock shaft for preventing operation of said arms and hammers while said rock shaft is moving from its starting point, and mechanism controlled by said rock shaft for operating said arms and hammers in printing operations and for restoring said arms and hammers to their idle positions when said shaft is moving toward its starting point.

51. In an adding and recording machine, the combination with type-carriers movable to and from recording position, type carried by said type-carriers, hammers for coöperating with said type to print, normally deënergized actuators for operating said hammers, couplings movable to and from position to connect said actuators and hammers, elements operable by said type-carriers for moving said couplings to position to connect said actuators and hammers, and a rock shaft whose operation is necessary before said type-carriers may move to recording positions, of mechanism actuated by said rock shaft when moving from its starting point for energizing said actuators, a device preventing operation of said hammers while said actuators are being energized, and mechanism operated by said rock shaft for releasing said device.

52. In an adding and recording machine, printing mechanism, a rock shaft, connections from the rock shaft for controlling the printing mechanism, devices requiring uniform movement of said rock shaft in its successive operations, a retarding device for retarding speed of operation of the rock shaft, and a movable stop member controlled by the retarding device to prevent complete movement of the rock shaft in one direction when said rock shaft is operated at excessive speed or with excessive force.

53. In an adding and recording machine, the combination with printing mechanism, a rock shaft, connections controlled by the rock shaft for enabling the printing mechanism to operate, and full-stroke mechanism requiring uniform movement of the rock shaft in its different operations, of a retarding device for retarding the speed of movement of the rock shaft, and a stop member controlled by the retarding device for stopping movement of the rock shaft in one direction when said shaft is operated with excessive force.

54. In an adding and recording machine, the combination with recording mechanism, a rock shaft having uniform extent of movement in all of its operations, and connections controlled by the rock shaft enabling the recording mechanism to operate during the initial operation of the return movement of the rock shaft, of a retarding device for preventing movement of said shaft at excessive speed or force, a stop member controlled by the retarding device effectively to stop movement of the rock shaft in one direction when operated at excessive speed or force, means preventing return movement of the rock shaft until the movement in the direction aforesaid is completed, and means for positioning said stop member to enable said rock shaft to complete its movement.

55. In an adding and recording machine, the combination with recording mechanism, a rock shaft having uniform extent of movement from and to its starting point at all operations, and connections controlled by the rock shaft enabling the recording mechanism to operate during the initial portion of the movement of the rock shaft toward its starting point and preventing operation of the recording mechanism during movement of the rock shaft from its starting point, a retarding device for preventing movement of the rock shaft at excessive speed or force, and a stop member controlled by the retarding device to stop movement of the rock shaft away from its starting point when said shaft is operated at excessive speed or force.

56. In an adding and recording machine, the combination with the printing mechanism thereof, of a rock shaft controlling the operation of the printing mechanism, means for rocking said rock shaft through uniform extent of movement at successive operations from a different starting point, mechanism preventing variation in extent of movement of said rock shaft, a retarding device for preventing operation of said rock shaft at excessive speed or force, and mechanism controlled by said device for stopping movement of the rock shaft in a direction away from its starting point when operated at excessive speed or force.

In witness whereof, I have signed this specification in the presence of two subscribing witnesses.

HARRY LANDSIEDEL.

Witnesses:
  BIRNEY DYSART,
  B. C. HARRISON.

Copies of this patent may be obtained for five cents each, by addressing the "Commissioner of Patents, Washington, D. C."